United States Patent Office
3,691,043
Patented Sept. 12, 1972

3,691,043
PREPARATION OF ACID HALIDES FROM PARAFFINS
Warren A. Thaler, Matawan, N.J., assignor to Esso Research and Engineering Company
No Drawing. Filed Sept. 9, 1965, Ser. No. 486,219
Int. Cl. C07c 51/58
U.S. Cl. 204—163 HE          15 Claims

ABSTRACT OF THE DISCLOSURE

Acid halides are prepared by reacting paraffins with carbon monoxide and halohydrocarbons; use of the halohydrocarbon allows formation of acid halide in preference to halide; products are useful as chemical intermediates, e.g., in the preparation of textile wetting agents.

---

This invention relates to the preparation of acid halides, and more particularly to a process for selectively preparing acid halides from saturated hydrocarbons, carbon monoxide, and a halohydrocarbon halogenating agent.

The prior art discloses several commonly employed methods for preparing acid halides. These include reacting carboxylic acids with halogenating agents, such as phosphorus trichloride, phosphorus pentachloride, thionyl chloride, and the like. Other methods previously known involve the reaction of an olefin with carbon monoxide and halogen acids, the reaction of alkyl halides with carbon monoxide at relatively high temperatures, or, the reaction of paraffins with oxalyl chloride or phosgene.

The importance of acid halides as chemical intermediates has fostered extensive research into better and less expensive methods of preparation of acid halides. The disadvantages of the prior art processes mentioned above reside mainly in low yields of acid halides, two-stage processes, or the use of high temperatures to produce satisfactory yields.

One object of this invention, therefore, is a process for selectively preparing acid halides from paraffin hydrocarbons. This and still other objects will become apparent from the following description.

In accordance with this invention a process is provided whereby paraffin hydrocarbons are reacted with a halohydrocarbon halogenating agent in the liquid phase, in the presence of a free radical initiator, and under elevated carbon monoxide pressure. The use of the halohydrocarbon halogenating agent allows selectivity to acid halide formation. (The mechanism of this reaction will be explained below.) Known reactions involving paraffin hydrocarbons and halogenating agents usually resulted in the alkyl halide, even though the reaction took place in the presence of carbon monoxide. However, the present invention selectively produces acid halide in high yields with only minor amounts of alkyl halide formation. Thus, a practical method for producing acid halides with relatively high yields and with comparatively inexpensive reactants has been achieved.

In general, the process of the present invention is applicable to aliphatic paraffins having from 1 to about 50 carbon atoms in the main chain. A preferred group are the paraffins having from 2 to about 20 carbon atoms in the main chain. Although straight chain and branched paraffins are equally applicable to this process, branched paraffins containing a relatively large number of tertiary hydrogens are undesirable reactants. Therefore, the aliphatic paraffin reactants readily employed in this process may be classed in two groups: normal paraffins and neo paraffins. The normal paraffins, as that term is defined for this invention, are those aliphatic saturated hydrocarbons containing only $CH_3-$ and $-CH_2-$ groups. Ethane, however, by its nature, is also considered to be a normal paraffin. Other examples of normal paraffins are: propane, n-butane, n-pentane, n-hexane, n-heptane, n-octane, etc. The neo paraffins, as that term is defined for this invention, are those aliphatic saturated hydrocarbons containing a carbon atom which has its valence completely satisfied by other carbon atoms. Representative of this class is neo pentane, whose systematic name would be 2,2-dimethylpropane.

Equally applicable to the present invention are cycloparaffins having from 3 to about 18 carbon atoms in the ring structure. A preferred group are the cyclo-paraffins having from 3 to about 10 carbon atoms in the ring structure. Examples of cyclo-paraffins are: cyclopentane, cyclohexane, cycloheptane, etc.

The paraffins reactants may be introduced to the reaction vessel either as individual paraffins, e.g. propane or n-butane or n-pentane or undecane or as mixtures of paraffins, e.g. propane and n-butane and n-pentane and undecane. In the latter instance, a mixture of acid halides of different molecular weights would be selectively formed during the reaction.

Halohydrocarbons that may be used in this invention are those having at least 2 halogen atoms bonded to a carbon atom. A preferred group are the lower alkyl polyhalides having from 1 to about 10 carbon atoms. Examples of these compounds are: carbon tetrachloride, 1,1,1 - trichloroethane, hexachloroethane, 1,1,1-trichloropentane, etc. Carbon tetrachloride is particularly preferred as the halohydrocarbon reactant.

The initiator employed in the present process can be chosen from any of the wide variety of free radical initiators known to the art. Examples of chemical free radical initiators include peroxides, hydroperoxides, azo compounds, diazo compounds, metal alkyls, other metal organics, metal carbonyls, hexaphenylethane, etc. Some specific examples of initiators are: ketone peroxides, such as methyl ethyl ketone peroxide, methyl isobutyl ketone peroxide, and cyclohexanone peroxide; diacyl peroxides, such as benzoyl peroxide, bis (4-chlorobenzoyl) peroxide, Bis (4-methoxy benzoyl) peroxide, phthalyl peroxide, and lauroyl peroxide; dialkyl peroxides, such as di-tert-butyl peroxide and dicumyl peroxide; peresters, such as tertairy butyl peracetate, tertiary butyl perbenzoate, and di-tert-butyl permalonate; metal alkyl free radical generators such as boron alkyls and aluminum alkyls, e.g. aluminum triethyl. Chemical free radical initiators are utilized in catalytic amounts, i.e. less than stoichiometric amounts. The initiator is chosen so that it decomposes to give radicals smoothly. For this reason, reaction temperatures must be selected which will allow the chemical initiator to decompose at a rate consistent with smooth radical formation, rather than decomposing the initiator so rapidly as to effectively eliminate the source of free radical initiation. Radiant energy such as actinic radiation or gamma radiation, e.g. a cobalt 60 source, can also be used to initiate the reaction.

The reaction vessel should be of a material which is inert to the products and reactants. In the examples accompanying this specification a glass lined reactor was satisfactorily employed.

A temperature range of from about 100° C. to about 250° C. has been found suitable for the reaction. However, the range for optimum conversion and selectivity will depend upon the particular paraffin reactant or reactants employed and whether a chemical promoter is utilized. Carbon monoxide gas pressure in the range of from about 1000 p.s.i. to about 20,000 p.s.i., with an initial pressure range of from about 2000 p.s.i. to 8000 p.s.i. at 25° C. is commonly used. In general, increasing carbon monoxide pressure will favor selectivity to acid halide. This result is illustrated by the following table:

EFFECT OF INCREASING CARBON MONOXIDE PRESSURE ON CONVERSION AND SELECTIVITY [a]

| | Conversion,[b] percent | Selectivity to acid chloride, percent |
|---|---|---|
| CO pressure at 25° C.: | | |
| 0 | 100 | 0 |
| 1,000 | 45 | 37 |
| 2,000 | 46 | 55 |
| 4,000 | 41 | 75 |
| 6,000 | 55 | 84 |
| 8,000 | 49 | 89 |

[a] 2:1 molar ratio cyclohexane to carbon tetrachloride, 5% t-butyl peroxide at 130° C. for 16 hours.
[b] Based on carbon tetrachloride.

Reaction time may vary from about 4 hours to about 65 hours, depending upon the reactants and conditions for any particular reaction. Normally, however, a period of about 16 hours should bring the reaction to substantial completion, i.e. maximum conversion and selectivity to acid halide.

According to the present invention, the paraffin, halohydrocarbon halogenating agent, and a free radical initiator (if such is employed) are charged in the liquid state to a suitable reaction vessel. A molar ratio of paraffin to halohydrocarbon of from about 1:1 to about 4:1 may be used, with a ratio of about 2:1 being preferred. A chemical initiator would be present in catalytic amounts of about 0.5% to 5.0% based on halohydrocarbon. The order of charging the vessel is not important and may be varied as the situation warrants. When the reaction vessel is filled with the liquid reactants, it is then pressurized with carbon monoxide gas. Temperature is adjusted to suit the reaction mixture. The reaction will take place in a stationary reactor, however, agitation or rocking throughout the cycle is preferred. Recovery of the acid halide product may be by any suitable method, e.g. fractionation.

It is believed that the reaction takes place through free redical formation as shown below, carbon tetrachloride being used for illustrative purposes only and RH designating a paraffin of the type applicable to this invention:

$$RH + \cdot CCl_3 \rightarrow R \cdot + CHCl_3 \quad (1)$$

$$R \cdot + CCl_4 \rightarrow RCl + \cdot CHCl_3 \quad (2)$$

$$R \cdot + CO \rightarrow RCO \cdot \quad (3)$$

$$RCO \cdot + CCl_4 \rightarrow RCOCl + \cdot CCl_3 \quad (4)$$

The sequence of steps (1), (3), and (4) which result in the formation of an acid halide having one carbon atom more than the starting paraffin may be summarized in a single expression:

$$RH + CCl_4 + CO \rightarrow RCOCl + CHCl_3$$

while the side reaction resulting in the formation of paraffin halide, an undesirable product may be expressed as:

$$RH + CCl_4 \rightarrow RCl + CHCl_3$$

As the liquid phase reaction proceeds, (3) must take place at a faster rate than (2) for appreciable formation of acid halide. The halogenation of the paraffin is considerably slowed by the use of a halohydrocarbon halogenating agent. This allows (2) to proceed and thus high selectivity to acid halide occurs at the expense of the formation of the paraffin halide. Selectivity to acid chloride in amounts as high as 90% can be achieved in this manner. Under similar conditions, the rate of reaction of alkyl radicals with common free radical halogenating agents, such as chlorine, bromine, N-bromosuccinimide, sulfuryl chloride, and the like, is rapid compared to the reaction rate of an alkyl radical with carbon monoxide. The product then would be an alkyl halide, with the exclusion of carbon monoxide from the product.

Acid halides find utility as chemical intermediates. For example, acid chlorides are employed in the preparation of textile wetting agents, in the preparation of chemicals with detergent properties, and as intermediates for foam boosters.

The following examples serve to illustrate the present invention but are not to be construed as limiting the invention in any way. Variations of these examples will be obvious to one skilled in the art.

In most of these examples 1-chloro, 3-fluorobenzene was added to the reaction mixture as an analytical standard. Acid halide was esterified for ease of analysis and all analyses were verified by vapor phase chromatography.

EXAMPLE 1

A mixture of cyclohexane, carbon tetrachloride and tertiary butyl peroxide in the molar ratios of 2:1:0.05 was placed inside a glass liner along with some 1-chloro-3-fluorobenzene as an internal analytical standard.

The liner was placed in a steel reactor and pressurized to 6000 p.s.i. with carbon monoxide. The reactor was heated to 130° C. and rocked for 16 hours. After which time it was cooled and vented.

The acid chloride was converted to ester by adding an excess of ethanol, the reaction mixture became warm. After standing for sufficient time to convert all the carbonylated product to ester the reaction mixture was analyzed by vapor phase chromatography. The product derived from the hydrocarbon consisted of ethyl cyclohexanecarboxylate 84% and chlorocyclohexane 16% at 65% reaction (conversion).

EXAMPLE 2

A mixture of cyclopentane, carbon tetrachloride and tertiary butyl peroxide in the molar ratio of 2:1:0.05 along with some 1-chloro-3-fluorobenzene was placed in a glass insert in a steel reaction vessel, which was pressured to 6000 p.s.i. with carbon monoxide and then heated to 130° C. and rocked for 16 hours.

After cooling and venting the cyclopentane carbonyl chloride was converted to ethyl cyclopentane carboxylate by reaction with ethanol. Analysis showed that the monosubstituted products from cyclopentane were ethyl cyclopentane carboxylate, 92 percent; and chlorocyclopentane, 8 percent; at 32 percent conversion.

EXAMPLE 3 n-Butane was condensed into a glass insert liner at —79° C. containing carbon tetrachloride along with some 1-chloro-3-fluorobenzene v.p.c. standard, such that the butane and carbon tetrachloride were in the molar ratio of 2.5 to 1. The insert was placed in a steel reactor warmed to 25° C. pressured to 5300 p.s.i. with carbon monoxide and then heated and rocked at 190° C. for 15.9 hours in the presence of a 6000 curie $Co^{60}$ gamma source. At the end of this period the vessel was cooled and vented and the reaction mixture treated with an excess of methanol to convert the acid chlorides to their corresponding methyl esters. The product derived from the butane consisted of methyl-2-methyl butyrate, 34 percent; methyl-n-valerate, 16 percent; 2-chlorobutane, 50 percent; at 53 percent reaction.

EXAMPLE 4

Propane, carbon tetrachloride, and 1-chloro-3-fluorobenzene in the ratio of 2.5:1:0.5 were placed in a glass lined steel reactor which was then pressured to 5300 p.s.i. at 25° C. The vessel was heated to 190° C. and was shaken and exposed to a 6000 curie $Co^{60}$ source for 20.3 hours. After cooling and venting the reaction mixture was treated with ethanol and analyzed. The products derived from propane were ethyl isobutyrate, 43 percent; ethyl n-butyrate, 18 percent; 2-chloropropane, 37 percent; and 1-chloropropane, 3 percent; at 37 percent conversion.

EXAMPLE 5

Ethane, carbon tetrachloride, and 1-chloro-3-fluorobenzene in the molar ratio of 2.4:1:0.5 were placed in a glass lined steel reactor and pressured to 5300 p.s.i. CO at 25° C. The reactor was heated to 250° C. and then rocked for 15.8 hours in the presence of a 6000 curie $Co^{60}$ source. After cooling and venting the propionyl chloride was converted to cyclohexyl propionate by treatment with cyclohexanol. Analysis showed a 72 percent selectivity to the carbonylated product at 50 percent conversion.

EXAMPLE 6

Neopentane, carbon tetrachloride and 1-chloro-3-fluorobenzene in the molar ratio of 2:1:0.5 were placed in glass lined steel reactor which was then pressured with 4400 p.s.i. CO at 25° C. The reactor was heated to 250° C. for 16 hours being shaken in the presence of a 6000 curie $Co^{60}$ gamma ray source. After cooling and venting the t-butyl acetyl chloride was converted to the corresponding methyl ester by treatment with methanol. Analysis showed that the neopentane derived products were 74 percent methyl t-butylacetate and 26 percent neopentyl chloride at 45 percent conversion.

EXAMPLE 7

153.8 g. (1.0 mole) of carbon tetrachloride and 312.6 g. (2.0 moles) undecane were placed in a 3 liter aminco bomb equipped with a glass insert liner. The reactor was then pressured to 5200 p.s.i. with carbon monoxide at 25° C. The temperature was then raised to about 130° C. and the rocked reaction mixture irradiated for forty-eight hours with a 6000 curie $Co^{60}$ source. After cooling and venting 457.4 g. of the reaction mixture was recovered. A 4.66 g. aliquot was analyzed by v.p.c. and indicated about 50 percent of the $CCl_4$ had been converted to $CHCl_3$.

The acid chloride in the mixture was esterified with n-butanol and the HCl generated was neutralized with solid $NaHCO_3$. The liquid was filtered, the solid washed with $CCl_4$ and the combined liquids weighing 531.7 g. were distilled.

DISTILLATION

| Fraction Number | Boiling point, °C. | Pressure, mm. | Weight, g. | Composition |
|---|---|---|---|---|
| 1-2 | 35-57 | 90-40 | 181.6 | $CHCl_3$, $CCl_4$, $n-C_4H_9OH$. |
| 3 | 94-99 | 32 | 180.0 | Undecane. |
| 4 | 70-68 | 12-8 | 31.7 | Undecane 82.6%, chloroundecane 7.4%. |
| 5 | 60-80 | 1 | 20.4 | Undecane 16.6%, chloroundecane 83.4%. |
| 6 | 114-120 | 0.4 | 95.5 | n-Butyl dodecanoates, trace of chloroundecane. |
| 7A | 113-144 | 0.005 | 10.4 | Chlorinated monoester 50%, diester 50%. |
| 7B | Residue | | 3.6 | Carbonyl containing brown material. |

RESULTS

| Products | Moles | Product distribution (mole percent) | Moles of $CCl_4$ converted | Selectivity based on $CCl_4$ percent |
|---|---|---|---|---|
| Chlorondecane | 0.102 | 20.1 | 0.102 | 18.8 |
| n-Butyl dodecanoates | 0.373 | 73.4 | 0.373 | 69.0 |
| Chlorinated esters | 0.018 | 3.5 | 0.036 | 6.7 |
| Diester | 0.015 | 3.0 | 0.030 | 5.5 |
| Total | 0.508 | 100.0 | 0.541 | 100.0 |

What is claimed is:

1. A method for preparing acid halides from paraffins, said acid halide having one carbon atom more than the starting paraffin, which comprises reacting a paraffin with a halohydrocarbon having at least 2 halogen atoms attached to one of the carbon atoms, said reaction taking place under superatmospheric carbon monoxide gas pressure, wherein radiant energy is used to initiate and sustain said reaction, said reaction taking place in an inert reaction vessel.

2. The method according to claim 1 wherein said carbon monoxide gas pressure ranges from about 1000 p.s.i. to about 20,000 p.s.i.

3. A method for preparing acid halides from paraffins, said acid halide having one carbon atom more than the starting paraffin, which comprises reacting a paraffin selected from the group consisting of normal paraffins, neo paraffins, cyclo-paraffins, and mixtures thereof with a halohydrocarbon having at least 2 halogen atoms attached to one of the carbon atoms, said reaction taking place under carbon monoxide gas pressures of from about 1000 p.s.i. to about 20,000 p.s.i., wherein cobalt 60 is used to initiate and sustain said reaction, said reaction taking place in an inert reaction vessel.

4. The method according to claim 3 wherein said paraffin is a normal paraffin having from 1 to about 50 carbon atoms.

5. The method according to claim 4 wherein said normal paraffin is ethane.

6. The method according to claim 4 wherein said normal paraffin is propane.

7. The method according to claim 4 wherein said normal paraffin is n-butane.

8. The method according to claim 4 wherein said normal paraffin is undecane.

9. The method according to claim 3 wherein said paraffin is a neo paraffin having from 1 to about 50 carbon atoms in the main chain.

10. The method of claim 8 wherein said neo paraffin is neo pentane.

11. The method according to claim 3 wherein said paraffin is a cyclo-paraffin having from 3 to about 18 carbon atoms in the ring.

12. The method according to claim 10 wherein said cyclo-paraffin is cyclohexane.

13. The method according to claim 10 wherein said cyclo-paraffin is cyclopentane.

14. A method according to claim 1 wherein said radiant energy is supplied by cobalt 60.

15. The method according to claim 3 wherein the molar ratio of said paraffin to said halohydrocarbon ranges from about 1:1 to about 4:1.

References Cited

UNITED STATES PATENTS

| 2,680,763 | 6/1954 | Brubaker | 260—544 XR |
| 3,367,953 | 2/1968 | Schmerling | 260—544 |

FOREIGN PATENTS

| 547,101 | 8/1942 | Great Britain | 260—544 |

OTHER REFERENCES

Gilbert: Sulfonation and Related Reactions, pp. 131–134.

LORRAINE A. WEINBERGER, Primary Examiner

E. J. GLEIMAN, Assistant Examiner

U.S. Cl. X.R.

204—163 R; 260—544 A, 408